Jan. 31, 1961  H. G. CHERRY  2,969,691
EXTENSION PEDAL FOR VEHICLE LIGHT DIMMER SWITCH
Filed Oct. 22, 1958
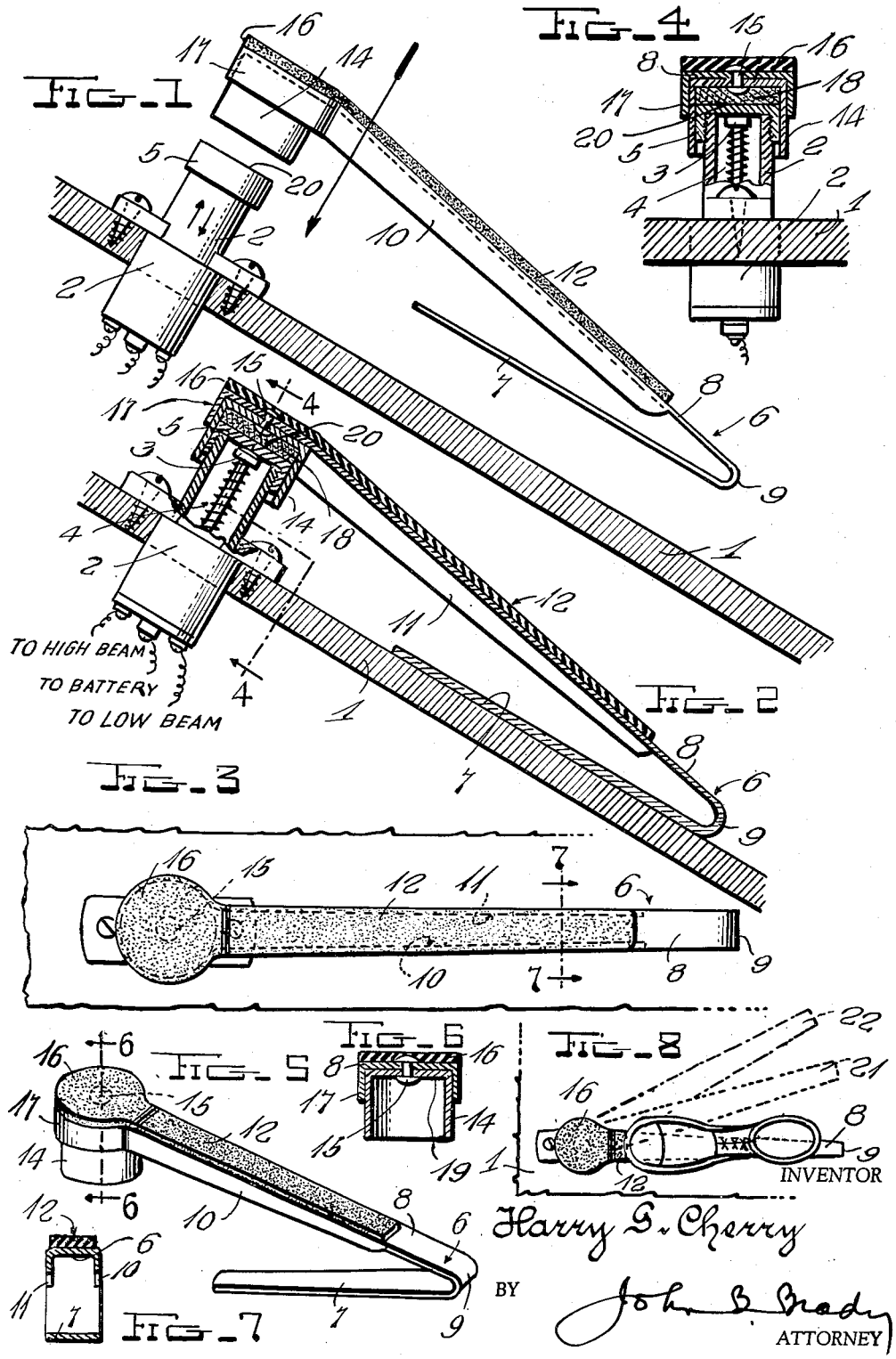
INVENTOR
Harry G. Cherry
BY
John B. Brady
ATTORNEY United States Patent Office 2,969,691
Patented Jan. 31, 1961

2,969,691

EXTENSION PEDAL FOR VEHICLE LIGHT DIMMER SWITCH

Harry G. Cherry, P.O. Box 846, Alamogordo, N. Mex.

Filed Oct. 22, 1958, Ser. No. 769,024

1 Claim. (Cl. 74—560)

My invention relates broadly to the headlight control system of vehicles and more particularly to a construction of extension pedal for a vehicle "Dim" and "Bright" foot control switch.

One of the objects of my invention is to provide a construction of dimmer switch extension pedal which may be readily installed over the conventional foot-push type of dimmer switch for facilitating operation of the dimmer switch from various positions of the driver or by drivers or to accommodate the operation of the switch to the leg-length of the driver.

Another object of my invention is to provide a construction of extension pedal for foot-push type "Dim" and "Bright" switches formed from an integral strip of sheet metal having an inverted cup-shaped member engageable over the foot-push dimmer switch of a vehicle and having a friction surface thereon to accommodate the driver's foot for operation of the dimmer switch.

Another object of my invention is to provide a construction of dimmer switch extension panel which is formed from a resilient strip of metal bent upon itself substantially in the shape of a V, one face of which is adapted to engage with the vehicle floor and the other face of which carries a frictional surface adapted to be engaged by the foot of the driver for depressing the dimmer switch from a position remote from the axis of the foot-push dimmer switch.

Still another object of my invention is to provide a construction of extension pedal for foot-push dimmer switches in vehicles formed from a resilient strip of metal, one portion of which is adapted to adjustably engage the mat on a vehicle floor and the other portion of which is adapted to be engaged by the foot of the driver and which carries a socket-like cap on the end thereof adapted to engage over the upwardly projecting end of the dimmer switch enabling the dimmer switch to be actuated by the driver's foot from a remote position.

Other and further objects of my invention are to provide a dimmer switch extension pedal which may be inexpensively stamped from sheet metal on a mass production scale and used in association with the foot-push dimmer switch of practically all vehicles as set forth more fully in the specification hereinafter following by reference to the accompanying drawings, in which:

Fig. 1 shows the dimmer switch extension pedal of my invention in side elevation about to be installed in position adjacent a dimmer switch, the dimmer switch being shown mounted adjacent the floor of a vehicle; the floor being indicated in section;

Fig. 2 is a view similar to the view illustrated in Fig. 1 but showing the dimmer switch extension pedal installed in position, the extension pedal being illustrated in longitudinal section fitting over the end of the dimmer switch which has been broken away and partially illustrated in longitudinal section;

Fig. 3 is a top plan view of the dimmer switch extension pedal shown in Figs. 1 and 2;

Fig. 4 is a transverse sectional view taken substantially on line 4—4 of Fig. 2 and showing the dimmer switch extension pedal engaged over the dimmer switch;

Fig. 5 is a perspective view of the dimmer switch extension pedal removed from the dimmer switch;

Fig. 6 is a vertical sectional view taken substantially on line 6—6 of Fig. 5 and illustrating the cylindrical cap carried by the dimmer switch extension pedal which engages the depressible member of the dimmer switch in a vehicle;

Fig. 7 is a transverse sectional view taken on line 7—7 of Fig. 3; and

Fig. 8 is a schematic view illustrating the manner in which the dimmer switch extension pedal of my invention may be oriented into a selected position to accommodate the foot of the driver in order to meet a wide variety of different conditions.

My invention is directed to a sheet metal dimmer switch extension pedal which may be pressed from resilient sheet material and provided with a cylindrical cup-shaped member adapted to fit over the upwardly protruding end of the foot-push switch of a vehicle headlight control switch. The structure of my invention is formed from a single piece of sheet metal which is bent upon itself in the form of a V. One side of the V engages the floor of the vehicle, while the other side of the V is provided with a friction facing strip adapted to be engaged by the driver's foot. This last mentioned portion of the strip is also provided with reinforcing means and the cylindrical cap, adapted to fit over the upper protruding end of a foot-push dimmer switch of a vehicle to enable the switch to be operated from a remote position by pressure being applied from the operator's foot at any portion of the friction facing strip carried by the extension pedal. The fact that the extension pedal may be mass produced by a pressing operation renders the device capable of mass production at low cost, providing a convenient accessory for the motorist.

Referring to the drawings in more detail, reference character 1 designates the conventional floor of a motor vehicle through which the conventional dimmer switch 2 is mounted for movement to either of two positions for controlling the high light beam or the low light at the headlights of the vehicle. This push type dimmer switch is conventional and includes a switch actuator which I have designated at 3 which is normally spring biased to an upwardly projected position by means of coil spring 4 which maintains the switch actuator 3 into contact with the lower face of the head 5 of the dimmer switch. The dimmer switch extension pedal of my invention consists of the resilient strip of metal shown at 6 which is folded upon itself at 7 to provide a floor-engaging portion and connected with the upwardly extending portion 8 of the strip 6 through an integral curved bend 9 where the parts of the strip shown at 7 and 8 are disposed in a substantially V shaped contour. The portion 8 of the extension pedal is provided with downwardly extending side portions 10 and 11 which serve as reinforcing means for the portion 8 of the extension increasing the rigidity of the extension pedal. The part 7 of the extension pedal extends more than half the length of the part 8 of the extension pedal and thereby provides a substantial floor-engaging surface area.

The upper portion of the part 8 is provided with a surfacing strip or pad 12 which extends from a position adjacent the ends of the downwardly extending side portions 10 and 11 to a position over the cylindrical inverted cup device 14. The cylindrical inverted cup device 14 is riveted to the lower face of the part 8 as indicated at 15 and the rubber strip or pad 12 extends over the head of rivet 15 and terminates in a circular end portion represented at 16. The downwardly extending side portions 10 and 11 are interconnected through a rounded end portion 17 which embraces the inverted cylindrical cup device 14 so that the inverted cylindrical cup device 14 is reinforced both at the end and at the opposite sides thereof preventing any excessive strain upon the riveted connection 15.

The inside of the inverted cylindrical cup device 14 is provided with a felt disc or pad 18 which is disposed between the flat circular end wall 19 of the inverted cylindrical cup device 14 and the upper surface 20 of the head 5 of the dimmer switch preventing wear on the switch button by the head of rivet 15.

The fact that the lower surface of strip 7 is smooth enables the attachment of my invention to be oriented and located on the floor of the vehicle represented at 1 in a position most convenient to the driver. In Fig. 8 I have shown the attachment of my invention located in full line in a position generally desired by the operator for operating the dimmer switch. By slightly lifting the device from the floor of the vehicle and orienting the device to either of the dotted line positions shown at 21 or 22 in Fig. 8 a more convenient position may be selected for the extension pedal and for operation thereof by the foot. When properly oriented the device 6 is again allowed to return to its selected position where part 7 of the strip 6 bears against the floor 1 for maintaining the extension pedal in position. Such adjustment is permitted by reason of the fact that the inverted cylindrical cup device 14 may be angularly shifted about the head 5 of the dimmer switch by frictional engagement therewith and then restored to the selected position with the lowermost portion of the strip 7 resting in frictional engagement with the flooring 1. The inverted cylindrical cup device 14 is sufficiently resilient to enable the device to be pressed into engaging position over the head 5 of the dimmer switch and frictionally maintained in position as heretofore explained.

The extension pedal may be readily installed without the aid of tools in a matter of seconds as the inverted cylindrical cup 14 slips over the switch button head 5 and stays in place by frictional engagement subject to orientation to the desired angular position as heretofore explained. The device 6 is free to give or slide on the car floor 1 and therefore excessive strains or stresses are eliminated. The resilience of the device 6 insures an extended life for the pedal attachment as movement at the integral curved bend 9 is restricted to a very slight angle.

While I have described my invention in one of its preferred embodiments I desire that it be understood that my invention is to be considered as disclosed herein in the illustrative sense and not in the limiting sense as I realize that modifications may be made in the structure of my invention and no limitations are intended other than may be imposed by the scope of the appended claim.

What I claim as new and desire to secure by Letters Patent of the United States is as follows:

An extension pedal for an automobile headlight dimmer switch, said switch having a reciprocatory push-button projecting above an inclined floor portion of the automobile, said extension pedal comprising a unitary resilient metal strip body portion, said strip body portion comprising a lower elongated arm adapted to rest directly upon the inclined floor portion and free from attachment thereto, said lower arm adapted to be spaced from said dimmer switch, an upper elongated arm spaced above the lower arm in upwardly and forwardly diverging relation thereto and extending forwardly of the lower arm for a substantial distance, a resilient bight portion integrally connecting the rear ends of said arms and serving to resiliently urge the upper arm away from the lower arm, a downwardly-opening cup element secured to the lower side of the upper arm at the forward end thereof and adapted to be located adjacent the pushbutton and to be engaged telescopically thereon and frictionally secured thereto, and side depending flanges secured to the upper arm and extending for the major portion of the length thereof to stiffen the upper arm.

References Cited in the file of this patent
UNITED STATES PATENTS

| | | |
|---|---|---|
| 2,167,868 | Best | Aug. 1, 1939 |
| 2,270,902 | Rubissow | Jan. 27, 1942 |
| 2,331,605 | Gold | Oct. 12, 1943 |
| 2,729,115 | Reynolds et al. | Jan. 3, 1956 |
| 2,851,902 | Dishoug | Sept. 16, 1958 |